Patented May 25, 1948 2,442,006

UNITED STATES PATENT OFFICE 2,442,006

PROCESS OF PREPARING AN ANTIBIOTIC SUBSTANCE FROM BACILLUS LARVAE

Eugene C. Holst, Laurel, Md.; dedicated to the free use of the People in the territory of the United States No Drawing. Application August 20, 1946, Serial No. 691,677

3 Claims. (Cl. 195—96)

(Granted under the act of March 3, 1883, as amended April 30, 1928; 370 O. G. 757)

1

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an antibiotic substance useful in the control of bacteria.

In accordance with the invention, it has been found that *Bacillus larvae*, which causes the disease of honeybee larvae known as American foulbrood, produces an antibiotic which suppresses the growth of many infectious bacteria. As a test of this honeybee larvae, as the natural culture medium for the bacillus, dead of the disease, and dried down in the cells of the brood comb (commonly known as "scales"), were placed at points on nutrient agar plates, some of the plates having been seeded with a soil suspension and others with market milk. The soil suspension and market milk were chosen as inocula because of the large variety of contaminating organisms contained in them. A majority of the various groups of contaminating organisms formed colonies. However, it was evident that an antibiotic had diffused from the scales into the agar, since inhibition zones surrounded the scales in which no contaminating organism colony growth could be seen. Tests of the media from the inhibition zones by transfer to a fresh culture medium proved them to be sterile, while transfer from the medium in which the antibiotic had not diffused gave growth of the contaminating organisms.

Using the same procedure except by seeding the agar plates with identified contaminating organisms, the antibiotic from the scales was shown to be active against *Staphylococcus aureus, Staphylococcus albus, Streptococcus agalactiae, Escherichia coli, Aerobacter aerogenes, Brucella abortus, Brucella melitensis, Bacillus subtilis, Bacillus alvei, Mycobacterium tuberculosis* var. *hominis*, and *Mycobacterium tuberculosis* var. *bovis*.

The antibiotic substance may be easily ob-

2 tained by extracting the scales with water, and recovering it from the water, as by drying to concentrate it, or by precipitation and filtering, for example, but it is resistant to the action of the common organic solvents, such as ether, methanol, ethanol, butanol, pyridine, chloroform and amyl acetate. It does not pass through a collodion membrane or a Seitz ultra filter, is stable indefinitely at room temperature and sufficiently stable to be sterilized by heat, and it does not decompose in the sunlight, these properties being unusual as compared to known antibiotic substances such as penicillin.

It has also been found that the antibiotic substance may be produced in culture directly from *Bacillus larvae*. It appears that no antibiotic substance is produced during the vegetative stage of the life-cycle of the *Bacillus larvae*. However, by employing a suitable culture medium, relatively large amounts of the antibiotic substance can be produced from the sporulation phase of the life-cycle of the *Bacillus larvae* which is induced following maximum vegetative growth.

To exhibit this further, a culture medium was made consisting of about 1.5 percent agar, about 1 percent peptone, about 1 percent yeast extract, about 3 percent asparagus pulp and the balance water, the mixture being adjusted with sodium hydroxide to a pH of 7.0. From slant cultures using the above medium inoculated with *Bacillus larvae* and cultured through the sporulation phase, the antibiotic substance was removed from the sporulated cultures by successive extractions with water and was recovered by drying to concentrate it. The antibiotic factors of the substance thus produced appear to be identical in their action to that of the substance obtained directly from the scales and identical in their resistance to heat.

Having thus described the invention, what is claimed is:

1. A process of producing an antibiotic substance comprising extracting honeybee larvae, dead of American foulbrood and dried down, with water, and recovering the antibiotic substance from the extract.

2. A process of producing an antibiotic substance comprising culturing *Bacillus larvae* through the sporulation phase of the life-cycle of the *Bacillus larvae*, extracting the culture with water, and recovering the antibiotic substance from the extract.

3. A process of producing an antibiotic substance comprising culturing *Bacillus larvae* on a medium consisting of about 1.5 percent agar, about 1 percent peptone, about 1 percent yeast extract, about 3 percent asparagus pulp and the balance water, adjusted to a pH of about 7.0, through the sporulation phase of the life-cycle of the *Bacillus larvae*, extracting the culture with water, and recovering the antibiotic substance from the extract.

EUGENE C. HOLST.

REFERENCES CITED

The following references are of record in the file of this patent:

Holst, Science, Dec. 7, 1945.

Holst and Sturdevant, Jour. Bact. 40: (1940), pp. 723 to 731.

Lockhead, Jour. Bact. 44 (1944) pp. 185–189.

Humfeld et al., Proc. Soc. Expel. Biol. and Med., Nov. 1943, pp. 232 to 235.